Patented Sept. 29, 1925.

1,555,451

UNITED STATES PATENT OFFICE.

HYYM E. BUC, OF ROSELLE, NEW JERSEY, ASSIGNOR TO STANDARD DEVELOPMENT COMPANY, A CORPORATION OF DELAWARE.

ISOPROPYL AROMATIC AMINE.

No Drawing. Application filed August 3, 1921. Serial No. 489,609.

*To all whom it may concern:*

Be it known that I, HYYM E. BUC, a citizen of the United States, residing at Roselle, in the county of Union and State of New Jersey, have invented a new and useful Improvement in Isopropyl Aromatic Amines, of which the following is a specification.

In accordance with the present invention isopropyl aromatic amines (aryl amines) may be prepared by heating the amine, for example, aniline, orthotoluidine, paratoluidine, or the like, in the presence of isopropyl chloride. The amine, for example, aniline, is placed in a suitable container, preferably one capable of withstanding pressure, such as an autoclave, and an approximately equimolecular proportion of isopropyl chloride is added thereto. The mixture is heated, preferably slowly, with a rise in pressure corresponding to the temperature, and at about 125 to 128° C. reaction begins to take place. The temperature is preferably maintained between 130 and 145° C. The pressure corresponding to the temperature employed gradually falls until a minimum is reached, when the process may be considered completed. The product of the reaction is a mixture of hydrochlorides of the aromatic amine and its isopropyl derivative, together with a lesser amount of the corresponding free bases, and may be completely converted into the free bases by distilling the mixture, preferably with steam, in the presence of an alkali, for example, caustic soda or lime.

With orthotoluidine and paratoluidine the reaction likewise starts at 125 to 128° C., the pressure rising, and is then maintained most conveniently between 130 to 145° C., the end of the reaction being indicated by the pressure at the temperature employed reaching a minimum or becoming stationary. The yield of substituted aryl amine is in each case approximately 87 to 90%, being admixed with the unchanged amine. The mixture is in each case substantially free from di-propyl amines. The products are oily liquids, colorless when pure, and may be employed industrially without separation of the unsubstituted amine, for example, for the production of rhodamine dyes, as stabilizers for explosives and for chemical synthesis.

Average products, containing the unconverted aromatic amines as above set forth, had specific gravities as follows: Isopropyl-aniline, 0.943 at 22° C.; isopropyl-orthotoluidine, 0.925 at 29° C.; isopropyl-paratoluidine, 0.926 at 21.5° C.

I claim:

1. The process of producing mono-isopropyl-aromatic amines which comprises heating a primary aromatic amine with isopropyl chloride.

2. The process of producing mono-isopropyl-aromatic amines which comprises heating a primary aromatic amine with isopropyl chloride in a closed vessel.

3. The process of producing mono-isopropyl-aromatic amines which comprises heating a primary aromatic amine with isopropyl chloride in a closed vessel to 130–145° C., the isopropyl chloride and amine being present in approximately equimolecular proportions.

4. The process of producing mono-isopropyl-aromatic amines which consists in heating a primary aromatic amine with isopropyl chloride and distilling the resultant product in the presence of an alkali.

5. The process of producing mono-isopropyl-aromatic amines which consists in heating a primary aromatic amine with isopropyl chloride in a closed vessel and distilling the resultant mixture in the presence of an alkali.

6. The process of producing mono-isopropyl-aromatic amines which consists in heating a primary aromatic amine with isopropyl chloride in a closed vessel, adding lime to the mixture and distilling off the amine.

7. The process of producing mono-isopropyl orthotoluidine which comprises heating the orthotoluidine with isopropyl chloride in a closed vessel.

8. An oily liquid containing about 87% of isopropyl orthotoluidine, the remainder being orthotoluidine, and having a specific gravity of about 0.925 at 29° C.

HYYM E. BUC.